3,632,788
PERFLUORO OLEFIN VINYLIDENE FLUORIDE
ELASTOMER PRODUCT AND PROCESS
David A. Stivers, St. Paul, and Richard A. Guenthner,
Birchwood, Minn., assignors to Minnesota Mining and
Manufacturing Company, St. Paul, Minn.
No Drawing. Filed Nov. 25, 1968, Ser. No. 778,823
Int. Cl. C08g 51/30, 51/48, 51/50
U.S. Cl. 260—30.8 R          9 Claims

ABSTRACT OF THE DISCLOSURE

Improved low temperature flexibility and softness are imparted to fluoro-olefinic elastomeric formulations which include highly fluorinated fluid plasticizer in excess of its ordinary compatibility limit with said elastomer, obtained by the inclusion of a "compatibility extender" comprising one or more low melting, low molecular weight, polar, fluoroaliphatic compounds. The inclusion of said "compatibility extender" also greatly facilitates processing of said formulations.

---

The present invention relates to materials which, when used together with fluorinated plasticizers, impart improved properties to processed (i.e., milled, extruded, molded and the like) fluorinated elastomeric compositions, which greatly extend the limits of compatibility of such plasticizers in those compositions, and which facilitate the processing thereof.

The outsanding thermal stability and solvent resistance of certain fluoro-olefinic elastomers, such as the perfluoropropene-vinylidene fluoride copolymers described in U.S. Pat. No. 3,318,854 and the prefluoropropene-vinylidene fluoride-tetrafluoroethylene terpolymers described in U. S. Pat. No. 2,968,649, has led to their widespread use in various applications which require elastomers of softness and flexibility over a wide range of temperatures. When properly formulated, e.g. as an extrudable mass or as a dispersion, highly fluorinated elastomers may be used to impregnate fibrous or porous materials, or to form coatings, films, vibration absorbing pads, and extruded and molded products such as O-rings, hoses, wire coatings and the like.

The processing of these elastomeric compositions has presented a multitude of problems, however, since the chemical nature of the fluorinated elastomers and their often severe use requirements have restricted the number of processing aids and plasticizers which may be employed in the formulations. Milling operations have often required elevated temperatures, molding has often required prolonged cycles and elevated temperatures, and extruded parts have tended to have rough surfaces. Oxygen-containing hydrocarbon derivatives, such as ketones and esters, while compatible with the elastomers, are extractable, for example, by lubricating oils and hydraulic fluids, and render the compounded product flammable, which is in certain applications, unacceptable as a safety hazard. Highly fluorinated plasticizing oils are not generally compatible in sufficient quantities to obtain the desired level of softeness and low temperature flexibility. When more than compatible quantities of plasticizer are added to the fluorinated elastomer in order to lower vulcanizate hardness or to maintain low temperature flexibility, they render the uncured mass difficult to process (e.g. mill and extrude) due to extreme surface lubricity.

Particularly in the case of extrusion, the incompatible plasticizer will exude when pressure is developed in the extruder, unduly lubricate the feed screw and stop passage of the stock through the equipment.

It is therefore an object of this invention to provide a fluorinated elastomer having an improved combination of properties.

One object of the present invention is to provide a fluorinated elastomer containing fluorinated plasticizer and having improved softness and flexibility at low temperatures.

A further object of the invention is to provide a material, the inclusion of which facilitates the processing of said elastomeric compositions by greatly extending the compatibility of highly fluorinated liquid and oil plasticizers in said compositions.

It is a further object of this invention to provide a fluorinated elastomer containing fluorinated plasticizer, having improved softness and flexibility at low temperatures, and additionally having good resistance to burning.

The above objects are realized by the incorporation of one or more low melting, low molecular weight, polar, fluoroaliphatic compounds which function as "compatibility extenders" into a fluorinated elastomer composition containing a fluorinated plasticizer in excess of the ordinary compatibility limit. By "ordinary compatibility limit" is meant the maximum amount of the fluorinated plasticizer which is compatible with the fluorinated elastomer in the absence of a compatibility extender as described herein. These compatibility extenders permit the uncured compound to be milled, extruded or molded similar to, or more satisfactorily than, the unplasticized rubber compound and characteristically contain at least on fluoroaliphatic radical, at least one polar group, and a polyvalent (generally divalent) linking group. The most preferred compounds are represented by the structural formula $R_fQ_mZ$. In the formula $R_f$ represents a fluorinated, saturated, monovalent, aliphatic (including cycloaliphatic) radical having from 3 to about 20 carbon atoms. The aliphatic radical may be straight or branched chain, or, if sufficiently large, may be cyclic, and it may include oxygen or trivalent nitrogen atoms bonded only to carbon atoms. Preferably $R_f$ is a fully fluorinated radical, however hydrogen or chlorine atoms may be present as substituents so long as not more than one atom of either is present for every two carbon atoms. Z represents a polar group such as —OR, —OX, —NR$_2$, —SH or the like wherein R is a lower alkyl group of less than about 5 carbon atoms or a hydrogen atom and X is ammonium or an alkali or alkaline earth metal such as sodium, potassium, magnesium and the like. Q represents a polyvalent linking group such as —CO—, —SO—, —SO$_2$—, —C$_n$H$_{2n}$— ($n$=1–20) or the like, and $m$ is 0 or 1. Two or more of such groups may be combined. The function of Q is simply to link the fluoroaliphatic radical to the polar group; in the case of $m$=0 the polar group may be linked directly to the fluoroaliphatic radical. Examples of compatibility extenders of the invention include:

$C_8F_{17}SO_2NH_2$
$C_8F_{17}SO_2N(C_2H_5)H$
$C_8F_{17}SO_2N(C_2H_5)C_2H_4OPO(OH)_2$
$C_{13}F_{27}CONHC_2H_4CO_2CH_3$
$(C_9F_{19}CO_2)_2Mg$
$(C_2F_5OC_2F_4CO_2)_2Mg$
$C_4F_9CONH_2$
$CF_3CF_2(OCFCF_3CF_2)_4OCFCF_3COOC_4H_9$
$C_8F_{17}SO_2N(CH_3)C_2H_4OH$

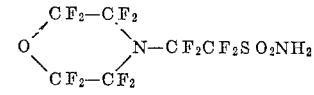

The compatibility extenders of the invention preferably contain at least 45% by weight of fluorine in the form of a fluoroaliphatic radical; when a non-flammable rubber is required, the compatibility extender should contain at least 60% by weight fluorine and it should contain less than about 5% by weight of hydrogen. For maximum efficiency in maintaining compatibility between an elastomer and a plasticizer, the compatibility extender is preferably a compound which is a solid at room temperature; that is, it should melt at a temperature of about 50° C. or higher. Compounds having melting points above 200° C. are undesirable since solubility in the plasticizing oil tends to be too low for efficient use.

For most applications, the presence of the compatibility extender compounds in the final cured elastomer is not necessary, and is frequently undesirable. For that reason, compounds which are relatively volatile and which decompose at a reasonable rate at temperatures above 50° C., but below about 200° C., are particularly preferred. Such compounds function during the processing operations of milling and extrusion, but are removed during the curing and post curing operations to provide a formed, vulcanized product with maximum thermal stability, solvent resistance, and low temperature flexibility.

In most formulations the preferred plasticizing oils are highly fluorinated, that is, contain at least about 50% by weight of carbon-bonded fluorine, and are preferably perfluorinated. They are liquids at room temperature, or have a melting point below about 50° C. In cases where plasticization is desired and the maximum stability in the final products is also desired, the liquids should have boiling points at atmospheric pressure below about 250° C. For materials which are to remain in the product to provide a plasticized, vulcanized elastomer, the boiling points should be above about 200° C. and preferably above 300° C. Examples of suitable plasticizing oils include: fluorocarbon ethers, such as those described in U.S. Pat. Nos. 2,500,388; 3,272,871; 3,303,145; 3,293,306; 3,355,397; 3,355,498; 3,242,218; fluorocarbon amines, such as those described in U.S. Pat. No. 2,616,927; fluorinated esters, such as those prepared from perfluoro monobasic or polybasic acids and hydrocarbon or fluoroaliphatic alcohols; as well as fluorinated siloxanes such as those described in U.S. Pat. Nos. 3,122,521 and 2,972,519. The plasticizer preferably has a melting point or a pour point below the desired low temperature at which the vulcanized elastomeric product is expected to function.

Some fluorinated plasticizers are more compatible with the fluorinated elastomers. Fluorocarbon esters such as dimethylperfluoroadipate are sufficiently compatible with the elastomers as well as with the less compatible fluorinated plasticizing oils so as to provide a mutual solubilizing medium and may therefore be conveniently used in conjunction with, for example, the less compatible fluoroaliphatic ether plasticizers.

One particularly useful fluorinated plasticizing oil, referred to as Fluoroether A, can be described as a linear oligomer of perfluoropropylene oxide, that is, it contains a number of repeating units having the structure $$[-OCF(CF_3)CF_2-]$$

This material has a density at 20° C. of about 1.9 grams/cc., a viscosity at 20° C. of 400 to 600 centistokes, a pour point of −30 to −35° C. and 90% of the material boils above 165° C. at 0.4 millimeter of mercury.

The amount of fluorinated plasticizer used in the elastomer composition depends primarily on the desired physical properties such as temperature characteristics and is therefore not critical. Generally from 0.5 to 2 parts by weight of compatibility extender is included for each part of fluorocarbon plasticizer in excess of the ordinary compatibility limit. Even higher ratios of compatibility extender/fluorinated elastomer may be employed, although no significant additional benefits are realized.

It is to be understood that the plasticized formulations may include the conventional fillers and pigments and the same curing or vulcanizing agents commonly employed with fluorinated elastomers. Milling, molding, extruding and other processing operations are carried out using normal procedures and operating conditions except that it is frequently possible to use lower operating temperatures and lower operating pressures than have been required in the past.

In order to more clearly point out the advantages of the invention the following example is provided.

EXAMPLE

Eight rubber formations (A through H) were prepared having the components listed in the table. Fluoroether A was employed as the plasticizing oil, the quantity of which was varied in each formulation, and the compatibility extender was a fluoroaliphatic phosphate. The elastomer employed in each formulation was a copolymer of $CF_2=CH_2/C_3F_6$ in an 80/20 mol ratio. The compounds were milled to mix, press cured and subsequently oven cured under the conditions indicated in the table. The figures in columns A through H represent parts by weight of the various components of the formulations.

Compounds A and B milled satisfactorily. The addition of 15 parts of plasticizer, (C), exceeded the compatibility limit; under the pressure of the mill, plasticizing oil exuded to the surface, causing the rubber to fall off the roll, and slippage rather than mixing in the nip was observed. Attempts to extrude formulation C in a standard extruder resulted in extensive slippage, again through loss of friction due to the exuded oil. Formulation D, including 27 parts plasticizing oil and 20 parts compatibility extender, extruded with no difficulty, less force being required of the extruder, and with a much better finish of the extruded part than was observed with formulation A.

Formulation E represents a material containing sufficient plasticizer to convert the elastomer to a putty-like consistency.

Formulations F, G, and H represent a slightly different curing system, both G and H providing extrusions with better surface finishes than the unplasticized control F. In addition, G and H provide very significantly softer and more flexible cured products, characteristics which are particularly desirable in hose linings.

While a rubber such as formulation E represents the ultimate in plasticization, a soft non-millable product extrudable under very slight pressure, formulation H appears to represent the limit for a millable elastomer in terms of plasticizer and compatibility extender content.

TABLE

| | Formulation | | | | | | | |
|---|---|---|---|---|---|---|---|---|
| | A | B | C | D | E | F | G | H |
| Elastomer | 100 | 100 | 100 | 100 | 100 | 100 | 100 | 10 |
| Carbon black (medium thermal) | 15 | 15 | 15 | 15 | 15 | 15 | 15 | 15 |
| Litharge | 20 | 20 | 20 | 20 | 20 | 20 | 20 | 20 |
| Hexamethylene diamine carbamate | 1 | 1 | 1 | 1 | 1 | | | |
| Fluoroether A | | 5 | 15 | 27 | 280 | | 32 | 60 |
| $C_8F_{17}SO_2N(C_2H_5)C_2H_4OPO(OH)_2$ | | | | 20 | 350 | | 40 | 50 |
| Hexamethylene diamine cinnamal | | | | | | 3 | 2.7 | 2.7 |
| Shore A hardness after press curing for 20 minutes at 160° C. | 60 | 57 | 56 | 50 | | | 50 | 45 |
| Shore A hardness of press cured material after oven curing for 24 hours at 150° C. | 61 | 62 | 59 | | | | | |
| Shore A hardness of press cured material after oven curing for 24 hours at 205° C. | 65 | 63 | 61 | 65 | | | 65 | 60 |

Compositions containing more than about 70 parts of ether per 100 parts of elastomer fail to band properly on the mill. For applications where resistance to burning is of primary importance, the rubber is subjected to a further post cure, although in many cases, a press cured product is satisfactory for use, as in the linings of hoses for transmission of gases.

What is claimed is:
1. In a plasticized fluoro-olefinic elastomeric formulation comprising a copolymer of perfluoropropene and vinylidene fluoride or a terpolymer of perfluoropropene, vinylidene fluoride and tetrafluoroethylene nad containing highly fluorinated fluid plasticizer in excess of the ordinary compatibility limit therein but in amounts less than about 280 parts by weight for each 100 parts of the elastomer, the improvement which comprises:

at least one compatibility extender comprising a low molecular weight, polar, fluoroaliphatic compound containing at least one polar group and containing at least 45% by weight of fluorine in the form of at least one fluoroaliphatic radical, said fluoroaliphatic compound having a melting point in the range of 50° C. to 200° C., said compatibility extender content being from about 0.5 to about 2 parts by weight per each part by weight of said plasticizer excess.

2. The formulation of claim 1 wherein the compatibility extender is represented by the formula $$R_f Q_m Z$$

wherein $R_f$ is a straight or branched chain fluorinated, saturated, monovalent, aliphatic (including cycloaliphatic) radical having from 3 to about 20 carbon atoms, Z is a polar group selected from the group —OR, —OX, —NR$_2$, and —SH wherein R is a lower alkyl group having less than 5 carbon atoms or a hydrogen atom and X is ammonium or an alkali or alkaline earth metal, Q is a polyvalent linking group for $R_f$ and Z, and $m$ is 0 or 1.

3. The formulation of claim 2 wherein $R_f$ is perfluorinated.

4. The formulation of claim 3 wherein $R_f$ further includes hydrogen or chlorine substituents in an amount not exceeding one hydrogen or one chlorine atom for every two carbon atoms.

5. The formulation of claim 2 wherein the compatibility extender includes at least 60% by weight fluorine and not more than about 5% by weight of hydrogen.

6. The formulation of claim 1 wherein the fluid plasticizer includes poly(perfluoropropylene oxide) and the compatibility extender is $C_8F_{17}SO_2NH_2$.

7. A formulation claim 1 in which said fluorinated elastomer is crosslinkable and said formulation readily processed.

8. A method of preparing a crosslinkable, readily processable, fluoro-olefinic elastomeric composition which comprises mixing a fluoro olefinic elastomer, a highly fluorinated plasticizing fluid and a compatibility extender of the type and amount indicated in claim 1.

9. The formulation of claim 1 wherein said plasticizer is present in amounts less than about 70 parts by weight for each 100 parts of the elastomer.

References Cited
UNITED STATES PATENTS

| | | | |
|---|---|---|---|
| 3,094,547 | 6/1963 | Heine | 260—461 |
| 3,318,854 | 5/1967 | Honn et al. | 260—87.7 |

ALLAN LIEBERMAN, Primary Examiner

T. DE BENEDICTIS, SR., Assistant Examiner

U.S. Cl. X.R.

260—30.4 R, 30.6 R, 32.4, 32.6 R, 33.2 R, 33.8 F

UNITED STATES PATENT OFFICE
CERTIFICATE OF CORRECTION

Patent No. 3,632,788          Dated January 4, 1972

Inventor(s) David A. Stivers and Richard A. Guenthner

It is certified that error appears in the above-identified patent and that said Letters Patent are hereby corrected as shown below:

Column 4, line 55 in the Table under Formulation H, "10" should be "100".

Column 5, line 5 in claim 1, "nad" should be "and".

Signed and sealed this 30th day of May 1972.

(SEAL)
Attest:

EDWARD M. FLETCHER, JR.
Attesting Officer

ROBERT GOTTSCHALK
Commissioner of Patents